United States Patent
Meesala et al.

(10) Patent No.: US 12,351,461 B2
(45) Date of Patent: Jul. 8, 2025

(54) CATALYST COMPOSITION AND ITS APPLICATIONS THEREOF

(71) Applicant: HINDUSTAN PETROLEUM CORPORATION LIMITED, Mumbai (IN)

(72) Inventors: Lavanya Meesala, Bengaluru (IN); Pramod Kumar, Bengaluru (IN); Ramachandra Rao Bojja, Bengaluru (IN); Sri ganesh Gandham, Bengaluru (IN)

(73) Assignee: HINDUSTAN PETROLEUM CORPORATION LIMITED, Mumbai (IN)

( * ) Notice: Subject to any disclaimer, the term of this patent is extended or adjusted under 35 U.S.C. 154(b) by 752 days.

(21) Appl. No.: 17/293,798

(22) PCT Filed: Jul. 24, 2020

(86) PCT No.: PCT/IN2020/050642
§ 371 (c)(1),
(2) Date: May 13, 2021

(87) PCT Pub. No.: WO2021/033197
PCT Pub. Date: Feb. 25, 2021

(65) Prior Publication Data
US 2022/0009780 A1    Jan. 13, 2022

(30) Foreign Application Priority Data

Aug. 21, 2019  (IN) .............. 201921033744

(51) Int. Cl.
*C01B 32/162* (2017.01)
*B01J 8/24* (2006.01)
(Continued)

(52) U.S. Cl.
CPC .............. *C01B 32/162* (2017.08); *B01J 8/24* (2013.01); *B01J 21/18* (2013.01); *B01J 23/80* (2013.01);
(Continued)

(58) Field of Classification Search
CPC .......... C01B 3/26; C01B 32/162; B01J 37/10; B01J 37/082; B01J 8/24; B01J 37/0207; B01J 23/80; B01J 21/18
See application file for complete search history.

(56) References Cited

U.S. PATENT DOCUMENTS

| | | |
|---|---|---|
| 4,009,120 A | 2/1977 | Hiffman |
| 4,028,269 A | 6/1977 | Carlson et al. |

(Continued)

FOREIGN PATENT DOCUMENTS

JP    4693463 B2 *  6/2011

OTHER PUBLICATIONS

Saraswat, et al, Ni—Cu—Zn/MCM-22 catalysts for simultaneous production of hydrogen and multiwall carbon nanotubes via thermocatalytic decomposition of methane, International Journal of Hydrogen Energy, vol. 36, Issue 21, 2011, pp. 13352-13360 (Year: 2011).*

(Continued)

*Primary Examiner* — Anthony J Zimmer
*Assistant Examiner* — Eric Scott Sherman
(74) *Attorney, Agent, or Firm* — Cooper Legal Group, LLC (57) ABSTRACT

The present disclosure discloses a catalyst composition comprising: (a) at least one steamed biochar; and (b) at least one tri-metallic catalyst, comprising metals selected from the group consisting of nickel, copper, zinc, and combinations thereof, wherein nickel loading is in the range of 20-60 wt %, the copper loading is in the range of 0.5-5.0 wt %, and the zinc loading is in the range of 0.5-5.0 wt with respect to (Continued)

the at least one steamed biochar. The instant disclosure further relates to a process of preparation of the catalyst composition and a process for production of hydrogen gas and carbon nanotubes.

13 Claims, 5 Drawing Sheets

(51) Int. Cl.
  *B01J 21/18* (2006.01)
  *B01J 23/80* (2006.01)
  *B01J 35/61* (2024.01)
  *B01J 35/63* (2024.01)
  *B01J 37/02* (2006.01)
  *B01J 37/08* (2006.01)
  *B01J 37/10* (2006.01)
  *C01B 3/26* (2006.01)

(52) U.S. Cl.
  CPC ........... *B01J 35/612* (2024.01); *B01J 35/613* (2024.01); *B01J 35/615* (2024.01); *B01J 35/617* (2024.01); *B01J 35/633* (2024.01); *B01J 35/635* (2024.01); *B01J 37/0207* (2013.01); *B01J 37/082* (2013.01); *B01J 37/10* (2013.01); *C01B 3/26* (2013.01); *C01B 2202/06* (2013.01); *C01B 2203/1058* (2013.01); *C01B 2203/1076* (2013.01); *C01B 2203/1082* (2013.01); *C01P 2002/88* (2013.01); *C01P 2004/03* (2013.01)

(56) References Cited

U.S. PATENT DOCUMENTS

| | | | |
|---|---|---|---|
| 2014/0162873 A1* | 6/2014 | Gu | ........................ C01B 32/342 |
| | | | 423/460 |
| 2016/0129424 A1* | 5/2016 | Pant | ...................... C01B 32/162 |
| | | | 502/343 |
| 2018/0016147 A1 | 1/2018 | Kwon et al. | |
| 2019/0084832 A1 | 3/2019 | Hu et al. | |
| 2019/0126254 A1 | 5/2019 | Medellin Rivera et al. | |

OTHER PUBLICATIONS

Pinilla, et al, Production of hydrogen and carbon nanofibers by thermal decomposition of methane using metal catalysts in a fluidized bed reactor, International Journal of Hydrogen Energy, vol. 32, Issue 18, 2007, pp. 4821-4829 (Year: 2007).*
Corresponding International Patent Application No. PCT/IN2020/050642, International Search Report, date mailed Jan. 11, 2021.
Corresponding International Patent Application No. PCT/IN2020/050642, Written Opinion of the International Searching Authority, date mailed Jan. 11, 2021.
"Phthalocyanine", Wikipedia, Rev. Feb. 23, 2021, Date Retrieved May 5, 2021, https://en.wikipedia.org/w/index.php?title=Phthalocyanine&oldid=1008439817.
"Biochar", Wikipedia, Rev. Apr. 30, 2021, Date Retrieved May 5, 2021, https://en.wikipedia.org/w/index.php?title=Biochar&oldid=1020641328.
SEPA Guidance, "Developments on Peat and Off-Site Uses of Waste Peat", May 2017, pp. 1-5, Version 1.

* cited by examiner

CATALYST COMPOSITION AND ITS APPLICATIONS THEREOF

CROSS-REFERENCE TO RELATED APPLICATIONS

This application is a national stage filing under 35 U.S.C. § 371 of International Application No.: PCT/IN2020/050642, filed on 24 Jul. 2020, which claims priority of India Patent Application No.: 201921033744, filed on 21 Aug. 2019, which is incorporated herein by reference in its entirety.

TECHNICAL FIELD

The present disclosure relates to the field of catalyst compositions. In particular, it pertains to catalyst composition which helps in the production of hydrogen gas and carbon nanotubes. More particularly the disclosure relates to a process for preparing hydrogen gas and carbon nanotubes from catalytic decomposition of at least one gaseous hydrocarbon over catalyst composition.

BACKGROUND

In the world there is an acute energy problem due to population growth, leading to an increase in energy demand, which is at odds with the sustainable development on a global scale. A possible scenario for the environmentally motivated policy cannot be implemented at the expense of fossil fuels after 2130 under the current energy strategies.

As it is well known, proven natural gas reserves of more ahead of proven oil reserves in the world. Besides the fact that natural gas is a gas, it is easier to extract from the interior than the fluid or viscous liquid. Currently, hydrogen is produced by steam reforming of methane but associated with a large quantity of carbon dioxide. Actually, when the steam reforming of methane is done apart from hydrogen released $CO_2$ is also released. In addition to such significant emissions of $CO_2$, additional purification step to separate hydrogen from carbon monoxide, which makes this process very expensive way of producing hydrogen.

One of the most promising alternative technologies for hydrogen production is a thermal decomposition of methane, also called thermal cracking of methane. This method provides the thermal decomposition of methane to solid carbon and hydrogen. In the case of this one-step process, it is technologically simple. One major advantage of methane cracking is a reduction and practical elimination of emissions of greenhouse gases. However, the thermal decomposition of methane, typically requires temperatures of over 1300° C., to effect the complete conversion of methane into solid carbon and hydrogen. An alternative approach Thermal catalytic decomposition of methane. Despite half a century of research, the literature also describes a number of problems associated with the use of thermo-catalytic decomposition of methane. These problems include the greenhouse gas emissions during catalyst regeneration, hydrogen contamination of the resulting carbon oxides and short life of the catalyst and the formation of a wide variety of carbon-products, which cannot always be controlled.

Thus, in the art, there is a need for methods of production of hydrogen as well as valuable products from various sources, which could solve the above problems.

SUMMARY

In an aspect of the present disclosure there is provided a catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, copper loading is in the range of 0.5-5.0 wt %, and zinc loading is in the range of 0.5-5 wt % with respect to the at least one steamed biochar.

In another aspect of the present disclosure there is provided a process for preparing the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, copper loading is in the range of 0.5-5.0 wt %, and zinc loading is in the range of 0.5-5 wt % with respect to the at least one steamed biochar, the process comprising: (a) heating a raw biochar with steam to obtain at least one steamed biochar; (b) obtaining at least one tri-metallic catalyst; and (c) impregnating the at least one tri-metallic catalyst on to the at least one steamed biochar followed by calcination to obtain the catalyst composition.

In yet another aspect of the present disclosure there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5 wt %, and the zinc loading is in the range of 0.5-5.0 wt % with respect to the at least one steamed biochar; and (ii) contacting at least one gaseous hydrocarbon and the catalyst composition to obtain a mixture and hydrogen gas; and (iii) processing the mixture to obtain carbon nanotubes.

These and other features, aspects and advantages of the present subject matter will be better understood with reference to the following description and appended claims. This summary is provided to introduce a selection of concepts in a simplified form. This summary is not intended to be used to limit the scope of the claimed subject matter.

BRIEF DESCRIPTION OF DRAWINGS

The detailed description is described with reference to the accompanying figure. In the figure, the left-most digit(s) of a reference number identifies the figure in which the reference number first appears. The same numbers are used throughout the drawings to reference like features and components.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "between" should be understood as being inclusive of the limits.

The phrase "other agricultural wastes" refers to any material which is generated after crop collection like wheat straw, corn stover, etc and it includes agricultural wastes which are known to person skilled in the art.

The term "GHSV" refers to gas hourly space velocity. It is the ratio of gas flow rate in standard condition to the volume of the catalyst loaded (only active phase, i.e., catalyst).

The term "raw biochar" refers to a product obtained from accelerated pyrolysis of one of the biomass, such as, saw dust. rice straw, rice husk, bagasse, other agricultural wastes.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Molar equivalent ratios of metals and organic agents may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 40° C. to about 50° C. should be interpreted to include not only the explicitly recited limits of about 40° C. to about 50° C., but also to include sub-ranges, such as 45° C. to 48° C., and so forth, as well as individual amounts, including fractional amounts, within the specified ranges, such as 42.2° C., 40.6° C., and 49.3° C., for example.

The present disclosure is not to be limited in scope by the specific embodiments described herein, which are intended for the purposes of exemplification only. Functionally equivalent products, compositions, and methods are clearly within the scope of the disclosure, as described herein.

In the framework of existing drifts in the energy sector of our century large-scale practical solutions to reduce carbon dioxide emissions pose a real problem. Thus, hydrogen production technology is extremely important. Furthermore, the formation of hydrogen should be such that there is no formation of carbon dioxide. A suitable choice of catalyst and reaction conditions may provide flexibility in the synthesis, which could lead to the pure and efficient production of hydrogen along with solid carbon products particularly in a manner that allows for facile separation of the carbon nanotubes produced from the catalyst used. Thus, the present disclosure provides a catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5 wt %, and the zinc loading is in the range of 0.5-5 wt % with respect to the at least one steamed biochar, which mitigates the problems as discussed above. It is important to note that it is the catalyst composition and reaction conditions (controlled by choice of temperature, and pressure) that allow in preventing loss of catalyst activity while maintaining a high selectivity for hydrogen production and the solid carbon product (carbon nanotube).

In an embodiment of the present disclosure, there is provided catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar.

In an embodiment of the present disclosure, there is provided catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar, wherein the metal structure is disposed on the at least one steamed biochar.

In an embodiment of the present disclosure, there is provided catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar, wherein the metal structure is disposed within the at least one steamed biochar.

In an embodiment of the present disclosure, there is provided catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar, wherein the metal structure is disposed in combination of on or within the at least one steamed biochar.

In an embodiment of the present disclosure, there is provided a catalyst composition comprising: (a) at least one steamed biochar; and (b) at least one tri-metallic catalyst comprising metals selected from the group consisting of nickel, copper, zinc, and combinations thereof, wherein the nickel loading is in the range of 27-31%, the copper loading is in the range of 2.3-2.7 wt %, and the zinc loading is in the range of 2.3-2.7 wt % with respect to the at least one steamed biochar.

In an embodiment of the present disclosure, there is provided a catalyst composition comprising: (a) at least one steamed biochar; and (b) at least one tri-metallic catalyst comprising metals selected from the group consisting of nickel, copper, zinc, and combinations thereof, wherein the nickel loading is in the range of 27-31 wt %, the copper loading is in the range of 2.3-2.7 wt %, and the zinc loading is in the range of 2.3-2.7 wt % with respect to the at least one steamed biochar, wherein the metal structure is disposed on the at least one steamed biochar.

In an embodiment of the present disclosure, there is provided a catalyst composition comprising: (a) at least one steamed biochar; and (b) at least one tri-metallic catalyst comprising metals selected from the group consisting of nickel, copper, zinc, and combinations thereof, wherein the nickel loading is in the range of 27-31 wt %, the copper loading is in the range of 2.3-2.7 wt %, and a zinc loading of 2.3-2.7 wt % with respect to the at least one steamed biochar, wherein the metal structure is disposed within the at least one steamed biochar.

In an embodiment of the present disclosure, there is provided a catalyst composition comprising: (a) at least one steamed biochar; and (b) at least one tri-metallic catalyst comprising metals selected from the group consisting of nickel, copper, zinc, and combinations thereof, wherein the nickel loading is in the range of 27-31 wt %, the copper loading is in the range of 2.3-2.7 wt %, and the zinc loading is in the range of 2.3-2.7 wt % with respect to the at least one steamed biochar, wherein the metal structure is disposed in combination of on or within the at least one steamed biochar.

In an embodiment of the present disclosure, there is provided a catalyst composition comprising: (a) at least one steamed biochar; and (b) at least one tri-metallic catalyst, wherein the at least one tri-metallic catalyst is disposed on the at least one steamed biochar. In another embodiment of the present disclosure, there is provided a catalyst composition comprising: (a) at least one steamed biochar; and (b) at least one tri-metallic catalyst, wherein the at least one tri-metallic catalyst is disposed within the at least one steamed biochar. In yet another embodiment of the present disclosure, there is provided a catalyst composition comprising: (a) at least one steamed biochar; and (b) at least one tri-metallic catalyst, wherein the metal structure is disposed in a combination of on or within the at least one steamed biochar.

In an embodiment of the present disclosure, there is provided a catalyst composition comprising: (a) at least one steamed biochar; and (b) at least one tri-metallic catalyst, wherein the at least one steamed biochar has a surface area in the range of 700-950 $m^2/g$ and a pore volume in the range of 0.60-0.70 cc/g.

In an embodiment of the present disclosure, there is provided a catalyst composition comprising: (a) at least one steamed biochar; and (b) at least one tri-metallic catalyst, wherein the at least one steamed biochar has a surface area in the range of 750-900 $m^2/g$ and a pore volume in the range of 0.62-0.68 cc/g.

In an embodiment of the present disclosure, there is provided a catalyst composition comprising: (a) at least one steamed biochar; and (b) at least one tri-metallic catalyst, wherein the at least one steamed biochar has a surface area in the range of 800-900 $m^2/g$ and a pore volume in the range of 0.62-0.65 cc/g.

In an embodiment of the present disclosure, there is provided a catalyst composition comprising: (a) at least one steamed biochar; and (b) at least one tri-metallic catalyst, wherein the at least one steamed biochar has a surface area of 830 $m^2/g$ and a pore volume of 0.63 cc/g.

In an embodiment of the present disclosure, there is provided a catalyst composition comprising: (a) at least one steamed biochar; and (b) at least one tri-metallic catalyst, wherein the at least one steamed biochar is obtained from raw biochar sawdust, raw biochar rice straw, raw biochar rice husk, raw biochar bagasse, other agricultural wastes, and combinations thereof.

In an embodiment of the present disclosure, there is provided a process for preparing the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar, the process comprising: (i) heating a raw biochar with steam to obtain at least one steamed biochar; (ii) obtaining at least one tri-metallic catalyst; and (iii) impregnating the at least one tri-metallic catalyst on to the at least one steamed biochar followed by calcination to obtain the catalyst composition.

In an embodiment of the present disclosure, there is provided a process for preparing the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar, the process comprising: (i) heating a raw biochar with steam to obtain at least one steamed biochar; (ii) obtaining at least one tri-metallic catalyst; and (iii) impregnating the at least one tri-metallic catalyst on to the at least one steamed biochar followed by calcination to obtain the catalyst composition, wherein heating a raw biochar with steam is carried out at a temperature in the range of 700-900° C. for a period in the range of 5-6 hours.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar; (ii) contacting at least one gaseous hydrocarbon and the catalyst composition of the present disclosure to obtain a mixture and hydrogen gas; and (c) processing the mixture to obtain carbon nanotubes.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading in the range of 26-32 wt %, the copper loading is in the range of 2.3-2.7 wt %, and the zinc loading is in the range of 2.3-2.7 wt % with respect to the at least one steamed biochar; (ii) contacting at least one gaseous hydrocarbon and the catalyst composition of the present disclosure to obtain a mixture and hydrogen gas; and (c) processing the mixture to obtain carbon nanotubes.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar; (ii) contacting at least one gaseous hydrocarbon and the catalyst composition of the present disclosure is carried out at a temperature in a range of 600° C.-800° C. to obtain a mixture and hydrogen gas; and (c) processing the mixture to obtain carbon nanotubes.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 27-31 wt %, the copper loading is in the range of 0.5-5.0 wt %, and the zinc loading is in the range of 0.5-5.0 wt % with respect to the at least one steamed biochar; (ii) contacting at least one gaseous hydrocarbon and the catalyst composition of the present disclosure is carried out at a temperature in a range of 600° C.-800° C. to obtain a mixture and hydrogen gas; and (c) processing the mixture to obtain carbon nanotubes.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading of 0.5-5.0 wt % with respect to the at least one steamed biochar; (ii) contacting at least one gaseous hydrocarbon and the catalyst composition of the present disclosure to obtain a mixture and hydrogen gas; and (c) processing the mixture to obtain carbon nanotubes, wherein the at least one gaseous hydrocarbon has GHSV in a range of 300-800 l/l/h.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar; (ii) contacting at least one gaseous hydrocarbon and the catalyst composition of the present disclosure to obtain a mixture and hydrogen gas; and (c) processing the mixture to obtain carbon nanotubes comprises process selected from acidic treatment, washing, drying, and combinations thereof.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar; (ii) contacting at least one gaseous hydrocarbon and the catalyst composition of the present disclosure to obtain a mixture and hydrogen gas; and (c) processing the mixture to obtain carbon nanotubes, wherein the carbon nanotubes are multi-walled nanotubes having ID/IG ratio of 0.65-1.0.

In an embodiment of the present disclosure, there is provided a process for production of hydrogen gas and carbon nanotubes, the process comprising: (i) obtaining the catalyst composition comprising: (a) at least one steamed biochar; and (b) at least one tri-metallic catalyst comprising metals selected from the group consisting of nickel, copper, zinc, and combinations thereof, wherein the nickel loading is in the range of 20-60 wt %, the copper loading is in the range of 0.5-5.0 wt %, and the zinc loading is in the range of 0.5-5.0 wt % with respect to the at least one steamed biochar; (ii) contacting at least one gaseous hydrocarbon and the catalyst composition of the present disclosure to obtain a mixture and hydrogen gas; and (c) processing the mixture to obtain carbon nanotubes, wherein the process is carried out in a reactor selected from fluidized bed reactor, moving bed reactor, or rotating bed reactor.

EXAMPLES

The following examples are given by way of illustration of the present invention and should not be construed to limit the scope of the present disclosure. It is to be understood that both the foregoing general description and the following detailed description are exemplary and explanatory only and are intended to provide further explanation of the claimed subject matter.

Example 1: Process of Preparation of Catalyst Composition

Raw biochar was obtained as a by-product from pyrolysis of one of the biomass (sawdust, rice straw, rice husk, bagasse, other agricultural wastes). Pyrolysis could be done from any of the methods selected from slow, fast or flash pyrolysis methods. Sawdust was pyrolyzed in fluidized bed reactor at 500° C. under $N_2$ atmosphere with continuous feed. After the separation of volatile gases from the products, raw biochar was collected. Raw biochar was further modified using steam in a fluidized bed for 5 hours at 800° C.

The process of preparation of the catalyst composition of the present disclosure comprises: (a) heating a raw biochar with steam to obtain at least one steamed biochar; (b) obtaining at least one tri-metallic catalyst; and (c) impregnating the metal structure on to the at least one steamed biochar followed by calcination to obtain the catalyst composition.

The raw biochar was treated with steam at 800° C. for 5-6 hours to obtain steamed biochar. Steamed biochar (SBC) was highly porous and had an excellent surface area (surface area of 830 m$^2$/g and a pore volume in the range of 0.63 cc/g) compared to raw biochar. Steamed biochar was prepared by an incipient wet-impregnation method. All chemicals in this study were of analytical grade and used without further purification. Nickel(II) nitrate hexahydrate (111.48 g), Copper(II) nitrate trihydrate (7.12 g), Zinc nitrate tetrahydrate (8.53 g) were used as active metal precursors and were procured from chemical suppliers to prepare 75 g fresh catalyst.

The metal precursors can be loaded simultaneously or sequentially in the at least one steamed biochar so that at least one tri-metallic catalyst was obtained. The at least one tri-metallic catalyst is a combination of nickel, copper, and zinc and the nickel loading is in the range of 27-31 wt %, the copper loading is in the range of 2.3-2.7 wt %, and the zinc loading is in the range of 2.3-2.7 wt % with respect to the at least one steamed biochar. The at least one tri-metallic catalyst was disposed on the at least one steamed biochar. Alternatively, the at least one tri-metallic catalyst was disposed within the at least one steamed biochar. After loading of metals, the particles were calcined under an inert atmosphere at 550° C. to obtain the catalyst composition.

To characterize the catalyst composition various characterization tests were conducted. A specific analytical method such as wavelength dispersive x-ray fluorescence was conducted for elemental analysis and the results obtained are tabulated in Table 1 below:

| Sample Name | NiO (in %) | Ni | CuO (in %) | Cu | ZnO (in %) | Zn |
|---|---|---|---|---|---|---|
| Catalyst 3 | 34.8 | 27.34 | 3.17 | 2.53 | 2.59 | 2.08 |

Example 2: Process for the Production of Hydrogen Gas and CNT: Test for Methane Decomposition (to Produce CNTs and Hydrogen) and Catalyst Regeneration The process was carried out in a fluidized bed reactor. Methane was supplied as a carbon source at a flow rate of 10 SPLH (GHSV in a range of 300-800 l/l/h). 17 g of catalyst composition was loaded into the reactor. The reactor was flushed with $N_2$ followed by heating under nitrogen till 550° C. Further reduction was done under $H_2$ environment, wherein the catalyst composition was reduced for 3 h. After reduction, the reactor was heated to a reaction temperature of 750° C.

The results of the test carried out over various types of catalysts, i.e., Catalyst 1: Steamed Biochar; Catalyst 2: 15% Ni supported on SBC; Catalyst 3: 30% Ni, 2.5% Cu, 2.5% Zn supported on SBC; Catalyst 4: 60% Ni, 2.5% Cu, 2.5% Zn supported on SBC are tabulated in Table 1 below:

| Catalyst | $H_2$ vol % at SOR | $H_2$ Vol % at EOR | Run time | CO conc (Vol %) | $CO_2$ (Vol %) |
|---|---|---|---|---|---|
| Catalyst 1 | 40 | 29 | 3 | 6.996 to 1.6 | 3.721 to 0.01 |
| Catalyst 2 | 89 | 70 | 3 | 0.0 | 0.0 |
| Catalyst 3 | 89 | 79 | 4 | 0.0 | 0.079 |
| Catalyst 4 | 90 | 76 | 2 | 0.2 | 0.0 |

SOR: start of reaction;
EOR: end of reaction

Figure 2:
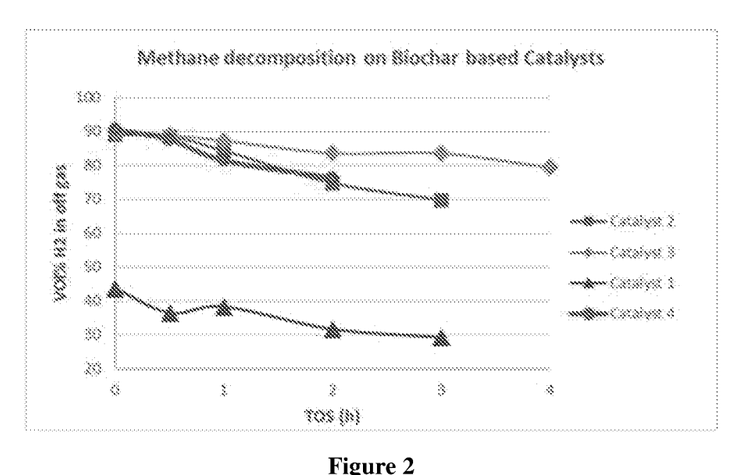
FIG. 2 illustrates the hydrogen yield versus time on stream (TOS) for various catalysts, in accordance with an implementation of the present disclosure.

It can be inferred from Table 1 that it was catalyst 3, wherein the maximum percentage volume of hydrogen evolution was observed, with no CO evolution and a negligible percentage of $CO_2$ being evolved. Further FIG. 2 shows the hydrogen yield versus time on stream (TOS), for catalyst 1, catalyst 2, catalyst 3, catalyst 4 at 750° C. reaction temperature respectively. It can be seen from hydrogen yield curves for various catalysts that all catalysts deactivated with time but catalyst 3 with the loading of 30% Ni and promoters gave 70-90 vol % $H_2$ in off gas with time. Among these catalysts, catalyst 3 having better catalytic performance, remained the best catalyst. For instance, catalyst 3 presented 89 vol % initial hydrogen yield and 79 vol % final hydrogen yield as compared to catalyst 1 with an initial hydrogen yield of 40 vol % and final hydrogen yield of 29 vol %.

Overall, among all the catalysts supported over steamed biochar, catalyst 3 remained the best catalyst, showing better catalytic activity as compared to the rest of the catalysts with no CO production and negligible $CO_2$ production.

The end product after prolonged decomposition (>5h), will result in a product of MWCNT (ID/IG ratio of 0.65-1.0) with less than 10% metal impurity which can be directly used in composite material. However, by prolonging the time on stream of the reactor, spent catalyst with CNT of less than 10% impurity can be obtained, further which can be purified by known means. This purified can be then used in niche CNT applications.

Figure 1:
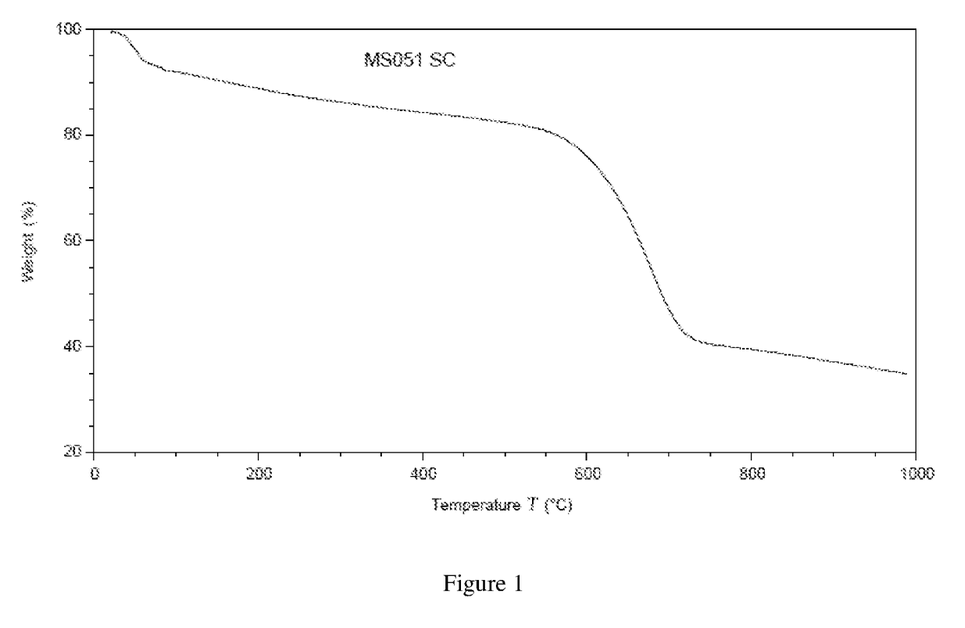
FIG. 1 illustrates the TGA analysis the catalyst 3, in accordance with an implementation of the present disclosure.

TGA analysis of the catalyst 3 was conducted and it was observed that as the time on stream increased, increase in the amount of CNT was observed in the spent catalyst, which in turn reduced the metal impurities in the spent catalyst. Being able to operate for long run hours, the final spent catalyst can be purified using acid digestion to remove the trace amount of metals (FIG. 1).

Example 3

Figure 3:
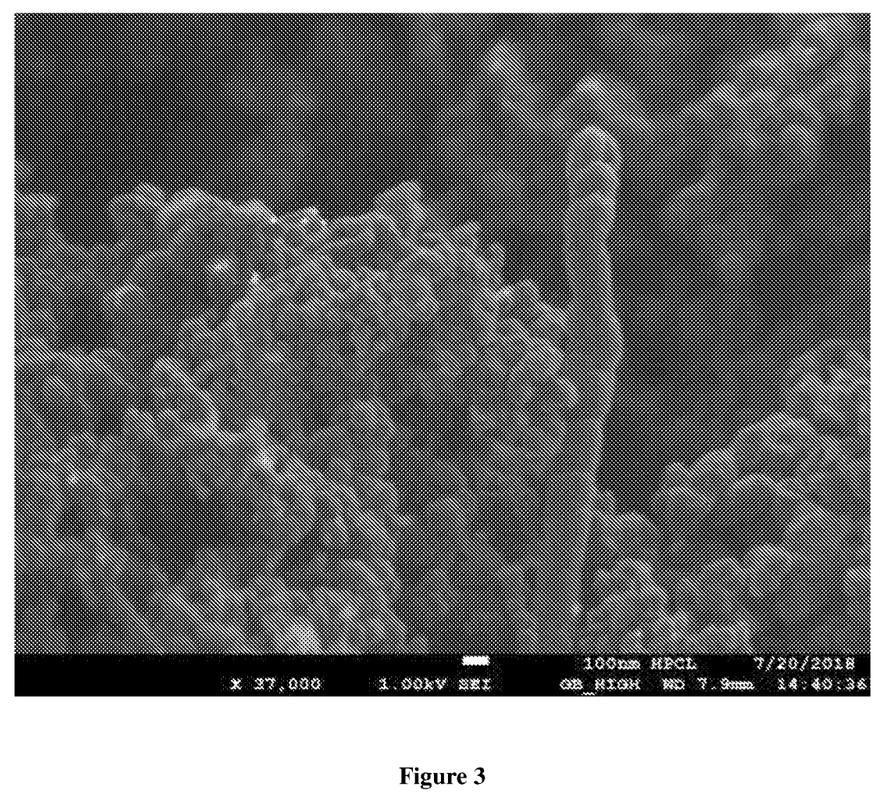
FIG. 3 depicts the SEM image of spent catalyst 1, in accordance with an implementation of the present disclosure.
Figure 4:
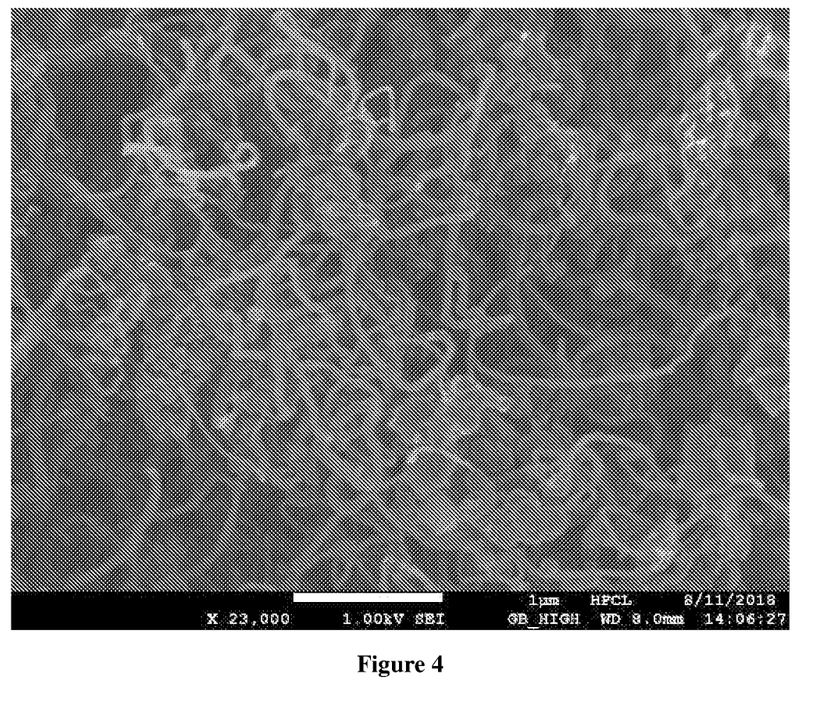
FIG. 4 depicts the SEM image of spent catalyst 2, in accordance with an implementation of the present disclosure.
Figure 5:
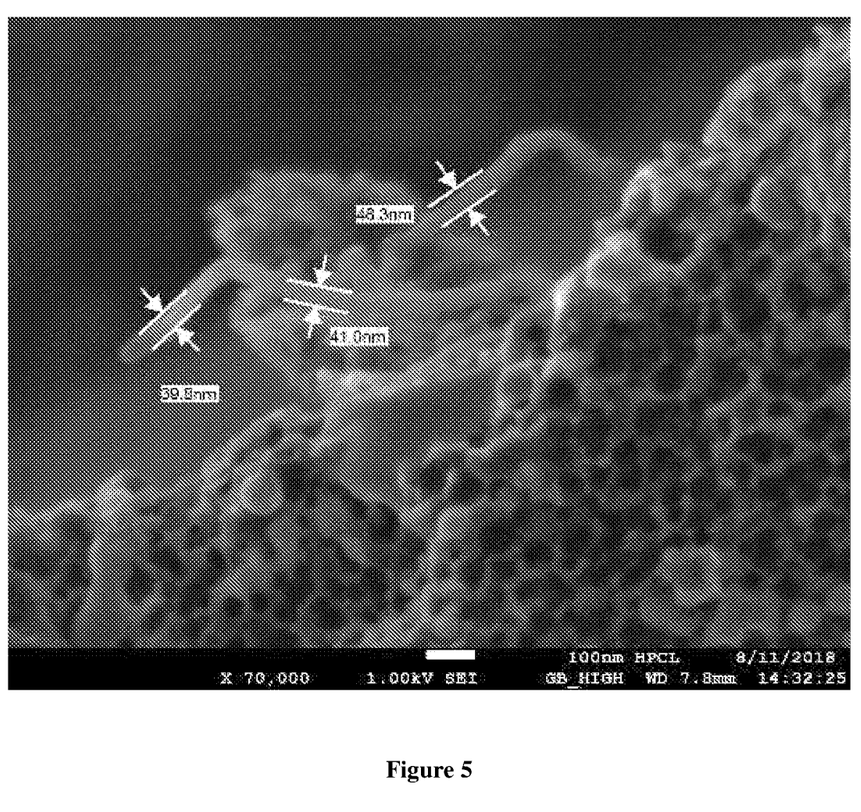
FIG. 5 depicts the SEM image of spent catalyst 3, in accordance with an implementation of the present disclosure.
Figure 6:
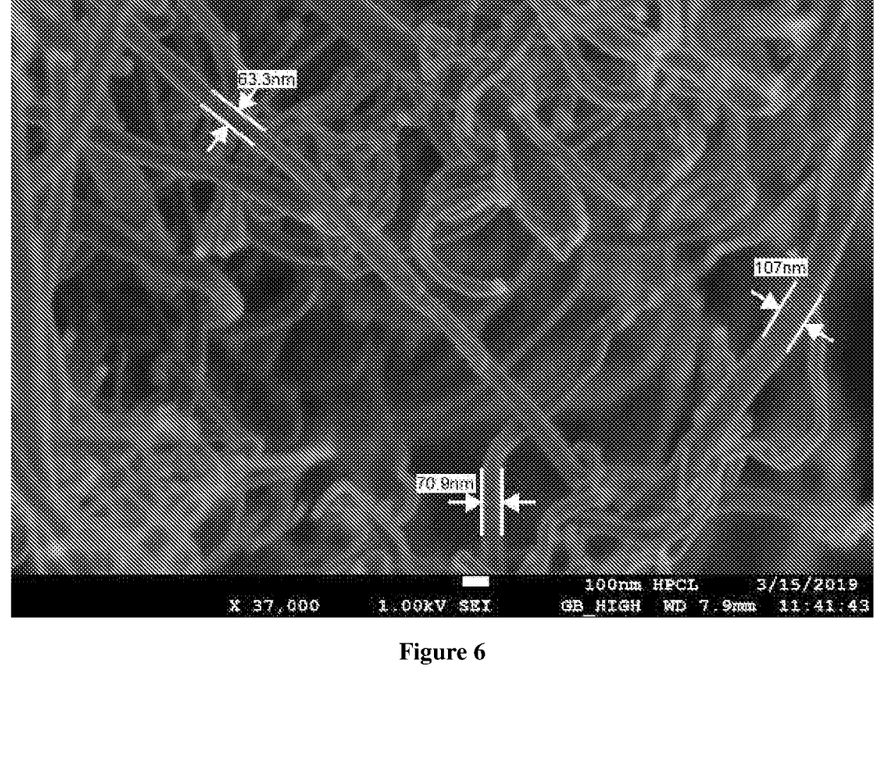
FIG. 6 depicts the SEM image of spent catalyst 4, in accordance with an implementation of the present disclosure.

The formation of CNT's was analyzed by the SEM images provided in FIG. 3, FIG. 4, FIG. 5, and FIG. 6. When catalyst 1 was used in the process of Example 2, very few/negligible CNT's were observed on the surface (FIG. 3). When catalyst 2 was used in the process of Example 2 the SEM image showed that there is nucleation of carbon nanoform on the catalyst, but no tube/sheet formation observed (FIG. 4). However, with catalyst 3, the process yielded multiwalled CNTs of dia in the range of 40 nm to 100 nm (FIG. 4).

With catalyst 4, i.e., at higher Ni loading (of 60%), the initial conversion was the same as catalyst 3. However, after 2 hours due to the agglomeration of catalyst, the reaction could not proceed whereas the catalyst 3 the reaction could operate for 4 hours without any operational issue.

It is thus apparent from results that the catalyst 3 ensured the formation of carbon nanotubes.

Although the subject matter has been described in considerable details with reference to certain examples and embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the present subject matter as defined.

Advantages of the Present Disclosure.

The present disclosure provides catalyst composition which is used in a process for the production of hydrogen and carbon nanotubes. Apart from the production of hydrogen it also makes it possible to obtain carbon nanotubes of good quality and in particular of a purity suitable for demanding industrial applications.

In addition to the abovementioned advantages, the CNT production process according to the present disclosure makes it possible to significantly improve the productivity of the catalyst utilized, without the need for an additional purification stage. It also allows the recycling of the by-products synthesized during the production of the hydrogen and CNTs, a lower production cost and a favorable energy balance.

We claim:

1. A catalyst composition for the production of hydrogen gas and carbon nanotubes comprising:
    (a) at least one steamed biochar; and
    (b) a tri-metallic catalyst comprising metals of nickel, copper, and zinc;
    wherein a nickel loading of the nickel is in a range of 27-31 wt %, a copper loading of the copper is in a range of 2.0-2.7 wt %, and a zinc loading of the zinc is in a range of 2.0-2.7 wt % with respect to the at least one steamed biochar.

2. The catalyst composition as claimed in claim 1, wherein the tri-metallic catalyst is disposed on, within, or a combination of on or within, the at least one steamed biochar.

3. The catalyst composition as claimed in claim 1, wherein the at least one steamed biochar has a surface area in a range of 700-950 $m^2/g$ and a pore volume in the range of 0.60-0.70 cc/g.

4. The catalyst composition as claimed in claim 1, wherein the at least one steamed biochar is obtained from raw biochar saw dust, raw biochar rice straw, raw biochar rice husk, raw biochar bagasse, other agricultural wastes, and combinations thereof.

5. A process for preparing the catalyst composition as claimed in claim 1, the process comprising:
    (a) heating a raw biochar with steam to obtain the at least one steamed biochar;
    (b) obtaining the tri-metallic catalyst; and
    (c) impregnating the tri-metallic catalyst on to the at least one steamed biochar followed by calcination to obtain the catalyst composition.

6. The process as claimed in claim 5, wherein the heating a raw biochar with steam is carried out at a temperature in a range of 700-900° C. for a period in a range of 5-6 hours.

7. A process for production of the hydrogen gas and the carbon nanotubes, the process comprising:
    (a) obtaining the catalyst composition as claimed in claim 1;
    (b) contacting at least one gaseous hydrocarbon and the catalyst composition as claimed in claim 1 to obtain a mixture and the hydrogen gas; and (c) processing the mixture to obtain the carbon nanotubes.

8. The process as claimed in claim 7, wherein the contacting at least one gaseous hydrocarbon and the catalyst composition as claimed in claim 1 is carried out for a period in a range of 15 minutes to 600 minutes at a temperature in a range of 600° C.-800° C.

9. The process as claimed in claim 7, wherein the at least one gaseous hydrocarbon has a gas hourly space velocity (GHSV) in a range of 300-800 l/l/h.

10. The process as claimed in claim 7, wherein the processing the mixture to obtain the carbon nanotubes comprises a process selected from acidic treatment, washing, drying, and combinations thereof.

11. The process as claimed in claim 7, wherein the carbon nanotubes are multi-walled nanotubes having an ID/IG ratio of 0.65-1.0.

12. The process as claimed in claim 7, wherein the process is carried out in a reactor selected from a fluidized bed reactor, a moving bed reactor, or a rotating bed reactor.

13. A catalyst composition for the production of hydrogen gas and carbon nanotubes, comprising:
    (a) at least one steamed biochar; and
    (b) a tri-metallic catalyst comprising metals of nickel, copper, and zinc;
    wherein a nickel loading of the nickel is 30 wt %, a copper loading of the copper is 2.5 wt %, and a zinc loading of the zinc is 2.5 wt % with respect to the at least one steamed biochar.

* * * * *